United States Patent
Vuorikari et al.

Patent Number: 5,455,328
Date of Patent: Oct. 3, 1995

[54] METHOD FOR ACIDIFICATION OF SOAP WITH SODIUM BISULPHITE SOLUTION

[75] Inventors: Olavi Vuorikari, Rajamäki; Teemu Tanner, Kerava; Jukka Koistinen, Helsinki; Kari Sarkkinen, Vantaa; Esko Mattelmäki, Varkaus, all of Finland

[73] Assignee: LT-Dynamics Oy, Vantaa, Finland

[21] Appl. No.: 145,507

[22] Filed: Nov. 4, 1993

[30] Foreign Application Priority Data

Nov. 10, 1992 [FI] Finland ................... 925106
Sep. 1, 1993 [FI] Finland ................... 933831

[51] Int. Cl.$^6$ ................... B01D 17/02
[52] U.S. Cl. ........... 530/230; 530/205; 530/206; 530/209; 530/233
[58] Field of Search ............... 530/205, 206, 530/209, 230, 233

[56] References Cited

U.S. PATENT DOCUMENTS 2,430,029 11/1947 Pollak et al. ............... 260/97.5
3,762,989 10/1973 Timpe ............... 162/16

OTHER PUBLICATIONS

"Tall Oil Soap Recovery" from Tall Oil, Pulp Chemical Association, New York, 1981.

Primary Examiner—James J. Seidleck
Assistant Examiner—Duc Truong
Attorney, Agent, or Firm—Young & Thompson

[57] ABSTRACT

The invention relates to acidification of soap, wherein the acidification is performed with a sodium bisulphite solution produced by absorbing the $SO_2$ entrained in the flue gases obtained from the combustion of odor gases derived from a chemical pulp mill into an alkaline sodium solution which is NaOH or oxidized white liquor, or with a sodium bisulphite solution which is $NaHSO_3$-containing mother liquid obtained from $SO_2$ or $NaHSO_3$ acidification of soap. The acidification can be conducted in one or more steps and by the cross-current and/or counter-current method by recycling the $Na_2SO_3$ mother liquid obtained from the acidification.

9 Claims, 1 Drawing Sheet

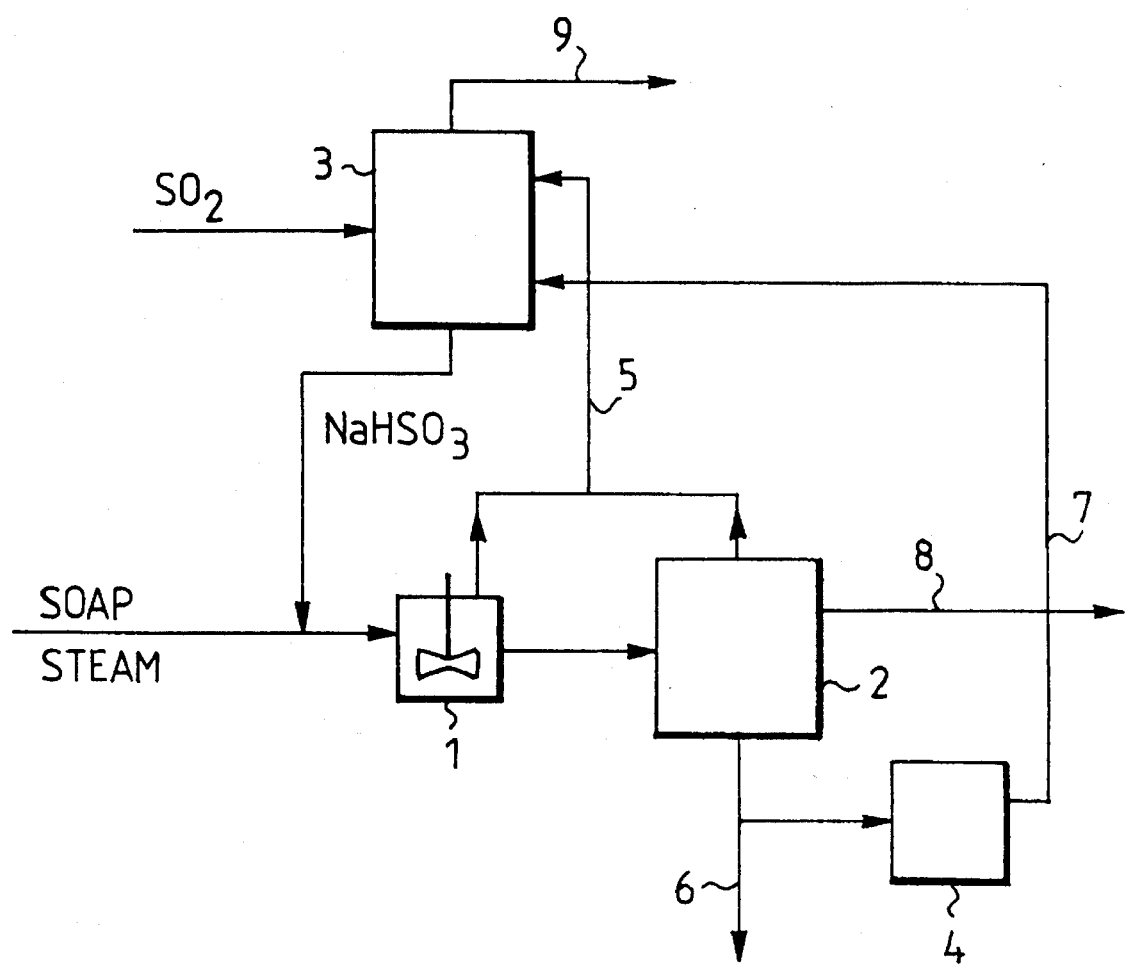

METHOD FOR ACIDIFICATION OF SOAP WITH SODIUM BISULPHITE SOLUTION

FIELD OF THE INVENTION

The present invention relates to acidification of soap.

BACKGROUND OF THE INVENTION

In the production of pulp from wood raw material under alkaline conditions by the sulphate method (also called kraft pulping) in which NaOH and $Na_2S$ are the active cooking chemicals, the fatty acids and rosin acids from wood extractives are saponified and form a soap. In addition to the above organic components, soap also contains "neutral substances", i.e. unsaponifiable organic components, likewise derived from wood extractives.

Softwood contains both fatty acids and rosin acids. Hardwood contains only fatty acids and additionally a greater amount of unsaponifiables than softwood.

It is known that soap can be acidified for example by sulphuric acid treatment. This is currently the predominant method in the chemical pulp industry. The resultant mixture of fatty acids and rosin acids and unsaponifiables is called crude tall oil.

When softwood or a blend of hardwood and softwood is cooked, soap is readily separated in the different stages of black liquor treatment and evaporation. Disturbance-free operation of the pulp mill requires collection and further treatment of the soap.

When the proportion of hardwood increases, the quality of the resultant crude tall oil in view of further refining is impaired, since hardwood yields only fatty acids and unsaponifiables into the crude tall oil. Often tall oil or soap must be added to pure hardwood cooking, in order for the extractive content of the resultant chemical pulp not to be too high. In that case, soap separates also from pure hardwood cooking. If this soap is acidified, it is no longer useful for further refining by the current methods. Said soap must be burned as such, or converted to tall oil and burned.

The quality of tall oil is best illustrated by the acid number. In Finland, plain pine cooking yields a product having an acid number of 160–170. Hardwood cooking yields an oil having an acid number of about 120–130. Oil having an acid number in excess of 145 is suitable for further refining.

Soap having too low an acid number must be burned. This is usually conducted in a soda recovery boiler, thus allowing recovery of the sodium present in the soap. In a lime sludge reburning kiln, sodium normally presents too great problems. On the other hand, burning in a soda recovery boiler requires that the boiler has 5–10% extra capacity, which is usually not available. Thus the soda recovery boiler is often the bottleneck of the production. If the sodium content of soap could be advantageously and sufficiently reduced, burning would also be possible in a lime sludge reburning kiln.

The air pollution control measures to be implemented in the near future will reduce the emission of gaseous sulphur compounds to 1.5 kg of sulphur/ton of chemical pulp. With current technology, emissions from a pulp mill using half softwood and half hardwood amount to 1 kg of sulphur/ton of chemical pulp for processes other than those carried out in the tall oil cooking department. Sulphur is introduced into the circulation of chemicals from different sources, such as wood, water, combustion fuel oil for the lime sludge reburning kiln and magnesium sulphate for oxygen bleaching, in an amount of about 2 kg of sulphur/ton of chemical pulp. This alone produces an excess of sulphur of about 0.5 kg/ton of chemical pulp. It is further to be noted that waste acid from chlorine dioxide plants contains 7–24 kg of sulphur/ton of chemical pulp. Thus the waste acid must be sewered, or an equivalent amount of sulphur must be withdrawn from the recycling by other means.

The above disadvantages have led to a need for a process for producing tall oil without addition of sulphur to the chemical cycle, in which the necessary acidifying chemical is derived from the circulation of chemicals in the pulp mill, in order for future tall oil production and further refining to be possible.

U.S. Pat. No. 3,901,869 suggests as a solution partial acidification of soap with carbon dioxide and final acidification with sulphuric acid or with waste acid from a chlorine dioxide plant. Yet it has showed that as a result of such a procedure, too much sulphur still remains in the circulation of chemicals, and further investment costs mount up.

In accordance with U.S. Pat. No. 2,430,029, soap is converted to tall oil by a two-step process, wherein partial conversion is first conducted with a sodium bisulphite solution, i.e. used brine from the second step, and the final acidification is performed with gaseous $SO_2$.

In a modern chemical pulp mill, the concentrated and dilute sulphur-containing odour gases that are produced must be collected and burned for environmental reasons alone. Burning is normally conducted in a separate burner or in a lime sludge reburning kiln. In both cases, dilute gases containing sulphur dioxide are obtained, and the sulphur contained in these gases is absorbed into NaOH. Alternatively, the procedure may involve absorption of the $SO_2$ needed for the post-acidification of the soap into fresh (make-up) NaOH, and absorption of the remaining $SO_2$ into oxidized white liquor, the resultant $NaHSO_3$ solution being used for initial acidification of the soap. The $SO_2$ needed for the post-acidification is prepared from $NaHSO_3$ solution obtained by absorption into $NaOH_3$, by evaporation whereupon the $NaHSO_3$ is decomposed into $SO_2$ and $NaHSO_3$.

The concentration of the $NaHSO_3$ solution obtained from absorption is about 20%. The amount of sulphur in this solution is about 2–3 kg/ton of chemical pulp. If the mill has a liquor heat treatment (LHT) process in which the viscosity of black liquor is reduced by thermal treatment, the amount of sulphurous gases produced therein may be increased so that the total sulphur flow is as high as 10 kg of sulphur/ton of chemical pulp.

As set out above, the sodium bisulphite solution resulting from $SO_2$ absorption in combustion of odour gases cannot be included in the circulation of chemicals within the framework of the future environmental regulations.

SUMMARY OF THE INVENTION

It is thus an object of the present invention to provide a method solving the above disadvantages. This object is achieved in accordance with a first embodiment of the invention in such a way that instead of sulphuric acid or waste acid from a chlorine dioxide plant, the soap acidification is performed with a sodium bisulphite solution produced by absorbing the $SO_2$ entrained in the flue gases obtained from the combustion of odour gases derived from a chemical pulp mill into an alkaline sodium solution which is NaOH or oxidized white liquor, or with a sodium bisulphite solution which is $NaHSO_3$-containing mother liquid obtained from $SO_2$ acidification of soap. The acidification is conducted in one or more steps, separation of the mother liquid being conducted between the steps.

The method according to another embodiment of the invention is characterized in that the acidification is conducted in a reactor 2 in one step or by the cross-current or counter-current method in several steps with a large total excess, over soap, of sodium bisulphite solution produced by absorbing the $SO_2$ entrained in the flue gases obtained from the combustion of odour gases derived from a chemical pulp mill in an absorption venturi 3 into an alkaline sodium solution which is NaOH or oxidized white liquor, or which is $Na_2SO_3$-containing mother liquid obtained from $SO_2$ or $NaHSO_3$ acidification of soap, whereafter the mother liquid separated from the tall oil/soap mixture is recycled via a settler tank 4 back to the venturi 3, wherefrom the solution is recycled to the soap treatment.

Generally speaking, 50–100% of the acidification can be carried out with a sodium bisulphite solution instead of sulphuric acid. The concentration of the $NaHSO_3$ solution used is normally about 10–30%, depending on the absorption apparatus in each case.

The $NaHSO_3$ acidification is normally performed at a temperature of 90°–150° C. and at atmospheric pressure or at superatmospheric pressure.

As set forth previously, the method of the invention can be carried out either in one step or in several steps by the cross-current and/or counter-current method. When the acidification is conducted in several steps, separation of the mother liquid is performed between the steps. The acidification can be either a batch-operated or a continuously operated process. The cross-current and counter-current methods are part of the normal professional skill in the field, and these methods are described for instance in Perry's Chemical Engineers' Handbook, McGraw-Hill Book Company, 6th Edition, Chapter 15, page 4.

One-step or multi-step sodium bisulphite acidification reduces the sodium content and viscosity of the soap. This enables burning of the soap in a lime sludge reburning kiln or in a soda recovery boiler. The more stages the acidification comprises, the more complete the conversion to tall oil. The degree of conversion is dependent on the number of steps, reaction time, temperature and mixing time. Experimental evidence shows that in three-step bisulphite acidification, at a high temperature and with vigorous stirring, about 95% of the sulphuric acid can be replaced with a bisulphite solution. Therefore, for instance in a mill that has used sulphuric acid in an amount of 2.1 kg of sulphur/ton of chemical pulp, the amount of sulphur introduced by the tall oil production into the circulation of chemicals is reduced to 0.1 kg of sulphur/ton of chemical pulp, and thus a balance is maintained even after the future regulations for sulphur emissions have entered into force.

The method of the invention allows much quicker separation of the soap oil/mother liquid phase than in sulphuric acid acidification. Recycling of the mother liquid was even found to accelerate the separation of the phases. Neither was the separation retarded when the acidification proceeded.

The soap can be converted to tall oil either in a sulphate pulp mill or in a separate cooking department. One of the advantages of the invention is that when pre-acidification is performed with a sodium bisulphite solution, the water content in the partially acidified intermediate soap can be diminished, which reduces transport costs and the use of sulphuric acid, when the final acidification is conducted centrally. This is performed at the chemical pulp mill without introduction of any additional sulphur thereinto, which has hitherto been necessary.

BRIEF DESCRIPTION OF THE DRAWING

In the following the invention will be set forth in greater detail with reference to the accompanying drawing, which schematically illustrates the inventive method.

DETAILED DESCRIPTION OF THE INVENTION

The $NaHSO_3$ solution employed for acidification of the soap is obtained by absorbing $SO_2$ from the combustion of odour gases in an absorption venturi 3 into an alkaline sodium solution of the above kind. The resultant solution, at this stage having a pH below 5.5, the steam needed for final heating and the soap are first passed into a mixing tank 1 from which the liberated gases, i.e. primarily $CO_2$, $SO_2$ and $H_2S$, are conveyed through line 5 back to the venturi 3. The gas-free reaction mixture and the controlled additional amount of $NaHSO_3$ solution are then passed into reactor 2 in which the acidification of the soap is continued. As the bisulphite solution reacts with the soap, a solution containing $NaHSO_3$ and mainly $Na_2SO_3$ is formed, having a pH of about 6–6.5. Following this, said mother liquid is separated from the tall oil/soap mixture obtained in the reactor and pumped into a settler tank 4. The settled mother liquid is recycled via line 7 back to the $SO_2$ venturi 3, in which the pH of the mother liquid again falls below 5.5 owing to the $SO_2$ absorption; the solution is then recycled to the soap treatment.

To maintain the liquid and chemical equilibrium, 10–20% of the resultant mother liquid is withdrawn from the recycling via line 6. As the pH of the mother liquid is about 6–6.5, it may be sent to the evaporator plant as such, or it is used for washing of the soap and the washing liquid that is withdrawn is conveyed to the evaporator plant.

Dilute $SO_2$ gas can be vented from the absorption venturi 3 through line 9 to post-absorption conducted with NaOH or other suitable alkali, and thus by evaporating the resultant $NaHSO_3$ solution, concentrated $SO_2$ is obtained for the post-acidification of the soap oil.

The resultant tall oil/soap mixture is withdrawn from the reactor through line 8 for instance for direct combustion. If the mixture is post-acidified, the amount of sulphuric acid needed for the post-acidification is only 5–20% of that needed for acidification conducted with sulphuric acid alone. The post-acidification can be conducted in the tall oil cooking department with, besides sulphuric acid, waste acid from a chlorine dioxide plant or with sulphur dioxide from post-absorption of $SO_2$ as set forth above.

By the method of the invention, the amount of sulphur introduced into the process by the tall oil cooking department can be substantially reduced. Furthermore, the method reduces considerably the formation of poisonous and malodorous hydrogen sulphide as compared with the amount formed in acidification conducted with sulphuric acid alone.

The examples below illustrate the invention.

EXAMPLE 1

Single-phase $NaHSO_3$ acidification without recycling of mother liquid.

Industrial soap, wherefrom tall oil is derived by sulphuric acid acidification, was used in the test. The acid number of tall oil was 146. The tall oil content of the starting soap was 55.1% by weight.

353 g of soap and 447 g of 20% by weight of a NaHSO$_3$ solution were weighed. The mixture was heated in a closed reactor at a temperature of 95°–105° C. for 30 minutes. Thereafter the gas produced was allowed to bubble out. The mixture was poured into a separate decanter which was placed in an incubator (95° C.) to settle.

After the settling, the intermediate from the upper phase and the majority of the lignin phase were separated for final acidification.

The separated phase had a weight of 264 g.

The final acidification was performed with sulphuric acid to pH 3, which corresponds to normal industrial usage.

In this case, the consumption of sulphuric acid, counted as 100% sulphuric acid, was 32 g/original of soap. When the acidification was carried out solely with sulphuric acid, the consumption was 82 g/kg of soap. Pre-acidification conducted with a sodium bisulphite solution thus saved 61% of sulphuric acid.

The volume of the pre-acidified soap was about 70% of the volume of the original soap. As 1000 kg of soap contains 551 kg of tall oil and 449 kg of water and black liquor, this portion decreased by 300 kg.

EXAMPLE 2

Three-step NaHSO$_3$ acidification without recycling of mother liquid.

This test was performed in the same manner as the single-step test described in Example 1, but the upper phase was separated and re-acidified with a fresh sodium bisulphite solution. The weight percentages between soap and intermediate as employed in the different steps were as follows:

step 1: 129% step 2: 148% step 3: 122%

The temperatures in the different steps were 95°–125° C. The sulphuric acid consumption of the product obtained from the third step was 6.6% as compared with sulphuric acid acidification.

EXAMPLE 3

Five-step NaHSO$_3$ acidification.

This example relates to the cross-current method. Industrial soap, wherefrom tall oil is derived by sulphuric acid acidification, was used in the test. The acid number of tall oil was 153. The tall oil content of the starting soap was 55.7% by weight.

In the first stage, 4400 g of soap and 8600 g of NaHSO$_3$ solution were weighed. The mixture was heated in a closed reactor to a temperature of 105° C. with periodic stirring. Thereafter the gas produced was allowed to bubble out. After 10 minutes, the mother liquid phase was separated via a drain valve. The pH of the spent NaHSO$_3$ solution obtained from a sulphate cellulose plant was 4.6. The remaining soap oil phase was re-treated with a fresh NaHSO$_3$ solution. This was continued for five stages. The doses of NaHSO$_3$ solution employed in the different steps in grams and per cent on the weight of the soap were as follows:

| step 1: | 8600 g | 194% |
| --- | --- | --- |

-continued

| step 2: | 5100 g | 116% |
| --- | --- | --- |
| step 3: | 5000 g | 113% |
| step 4: | 5200 g | 118% |
| step 5: | 7300 g | 165% |

The soap oil separated from the last step, i.e. the soap/tall oil mixture, was acidified with sulphuric acid at various doses. Further, water was added in this step in an equal weight ratio to the soap oil. The reaction mixtures were stirred and allowed to stand in an incubator at 80° C. overnight. Subsequent to the standing, the pH value of the separated mother liquid phase was measured. The pH values and the doses of 10% by weight of sulphuric acid employed, which are indicated as per cent on the amount of acid needed in sulphuric acid acidification, were as follows:

| pH 1.1 | 32% |
| --- | --- |
| pH 1.3 | 24% |
| pH 1.6 | 20% |
| pH 4.1 | 15% |
| pH 5.3 | 10% |

Tall oil having a pH of at least 3 is herein considered to be completely acidified. When it is further taken into account that the weight of soap oil is 70–80% of the weight of the soap, the sulphuric acid consumption of the product obtained from the fifth step was 5–15% of the acid consumption in sulphuric acid acidification.

The mother liquids from all steps were combined for use in the test set forth in Example 4.

EXAMPLE 4

Single-step NaHSO$_3$ acidification with recycling of mother liquid.

In the first step, 2400 g of soap and 9000 g of mother liquid employed in Example 3 were used; the mother liquid was in this case fortified with SO$_2$ gas. The reaction and the separation of the mother liquid were performed similarly as in Example 3. In each subsequent step, the mother liquid from the preceding step was treated with SO$_2$ gas. The acid solution obtained was used as a processing acid for a new soap batch, as was the original mother liquid employed in Example 3, which in this case was fortified with SO$_2$ gas. The reaction conditions were the same as in the first step.

The pHs of the acids and mother liquids in the different steps and the doses of acid in relation to soap doses were as follows:

| step 1: | acid 1 | pH 3.2 | 375% |
| --- | --- | --- | --- |
| | mother loquid 1 | pH 6.2 | |
| step 2: | acid 2 | pH 4.9 | 208% |
| | mother liquid 2 | pH 6.5 | |
| step 3: | acid 3 | pH 3.1 | 213% |
| | mother liquid 3 | pH 6.2 | |
| step 4: | acid 4 | pH 4.6 | 216% |
| | mother liquid 4 | pH 6.3 | |

At no stage was precipitate formed on the bottom of the mother liquid vessels.

A foaming test was performed with the mother liquid from the last step, in which a batch of about 5 kg of mother liquid was vigorously stirred in the reactor for one minute. A foam layer of a thickness of about 1 cm only was produced, and the foam was not stable. For comparison, the reactor was washed with 30 g of soap oil and 10 l of water. After mixing of one minute, the reactor was filled with foam.

The foaming test shows that the mother liquid which has a very low foaming propensity is suitable for recycling into the venturi.

We claim:

1. A method for the acidification of soap, which comprises:

conducting the acidification in a reactor with a large total excess, over soap, of a sodium bisulphite solution having a pH less than 5.5, said sodium bisulphite solution being selected from the group consisting of
   i) a product resulting from absorbing $SO_2$ entrained in flue gases obtained from the combustion of odour gases derived from a chemical pulp mill in an absorption venturi (3) into an alkaline sodium solution selected from the group consisting of NaOH, oxidized white liquor, and $Na_2SO_3$-containing mother liquid obtained from $NaHSO_3$ acidification of soap, and
   ii) a $NaHSO_3$-containing mother liquid obtained from $SO_2$ or $NaHSO_3$ acidification of soap;

separating the mother liquid from a tall oil/soap mixture produced from the acidification in the reactor;

recycling the separated mother liquid via a settler tank (4) back to the venturi (3); and separating therefrom the sodium bisulphite solution for use in the acidification of soap.

2. A method as claimed in claim 1, wherein the pH of the mother liquid withdrawn from the reactor is about 6–6.5.

3. A method as claimed in claim 1, wherein the acidification is conducted at a temperature of 90°–150° C.

4. A method as claimed in claim 1, wherein the acidification is conducted at atmospheric pressure or at superatmospheric pressure.

5. A method for the acidification of soap which comprises the steps of:
   a) providing a sodium bisulphite solution having a pH less than 5.5, said sodium bisulphite solution being selected from the group consisting of
      i) a product resulting from absorbing $SO_2$ entrained in flue gases obtained from the combustion of odour gases derived from a chemical pulp mill into an alkaline solution selected from the group consisting of NaOH and oxidized white liquor, and
      ii) a $NaHSO_3$-containing mother liquid obtained from $SO_2$ acidification of soap; and
   b) acidifying soap with said sodium bisulphite solution.

6. A method according to claim 5, wherein the step of acidifying is conducted in a plurality of steps, said method further comprising separating mother liquid between said plurality of steps.

7. A method according to claim 5, wherein the step of acidifying is conducted at a temperature of 90°–50° C.

8. A method according to claim 5, wherein the step of acidifying is conducted at atmospheric pressure or at superatmospheric pressure.

9. A method according to claim 5, wherein the step of acidifying said soap with sodium bisulphite results in a tall oil/soap mixture, said method further comprising absorbing dilute 1–5% $SO_2$ gas obtained from odour gas combustion into fresh NaOH or oxidized white liquor so as to provide a $NaHSO_3$-containing liquid, preparing concentrated $SO_2$ by evaporating said $NaHSO_3$-containing liquid, and converting said tall oil/soap mixture into tall oil with said concentrated $SO_2$.

* * * * *